(12) United States Patent
Pflug et al.

(10) Patent No.: US 8,043,180 B2
(45) Date of Patent: Oct. 25, 2011

(54) TENSIONER FOR A TRACTION MECHANISM

(75) Inventors: Rainer Pflug, Heilsbronn (DE);
Matthias Schmidl, Eckental (DE);
Roland Arneth, Eggolsheim (DE);
Stefan Mack, Erlangen (DE)

(73) Assignee: Schaeffler KG, Herzogenaurach (DE)

( * ) Notice: Subject to any disclaimer, the term of this patent is extended or adjusted under 35 U.S.C. 154(b) by 448 days.

(21) Appl. No.: 12/393,348

(22) Filed: Feb. 26, 2009

(65) Prior Publication Data

US 2009/0215564 A1   Aug. 27, 2009

(30) Foreign Application Priority Data

Feb. 27, 2008   (DE) .................. 10 2008 011 368

(51) Int. Cl.
*F16H 7/12* (2006.01)

(52) U.S. Cl. ....................................... 474/135

(58) Field of Classification Search .................. 474/109, 474/111, 133, 135, 136, 138, 140
See application file for complete search history.

(56) References Cited

U.S. PATENT DOCUMENTS

| 4,983,144 | A  | * | 1/1991 | Ojima | 474/111 |
|---|---|---|---|---|---|
| 5,004,448 | A  | * | 4/1991 | Ojima | 474/111 |
| 5,035,680 | A  | * | 7/1991 | Ojima | 474/138 |
| 5,037,357 | A  | * | 8/1991 | Ojima | 474/111 |
| 2006/0229151 | A1 | * | 10/2006 | Jansen et al. | 474/117 |
| 2009/0215563 | A1 | * | 8/2009 | Sauermann et al. | 474/135 |
| 2010/0022340 | A1 | * | 1/2010 | Schmidl et al. | 474/135 |
| 2010/0035712 | A1 | * | 2/2010 | Hartmann et al. | 474/110 |
| 2010/0048336 | A1 | * | 2/2010 | Mack et al. | 474/138 |

* cited by examiner

*Primary Examiner* — William E Dondero
(74) *Attorney, Agent, or Firm* — Lucas & Mercanti, LLP (57) ABSTRACT

A tensioner (1, 1') for a traction mechanism such as a belt, chain or the like, with a tensioning lever (4) which can be acted on by a helical spring (2), can pivot about a stationary shaft and on which a tensioning element is provided for abutment against the traction mechanism to be tensioned. The helical spring (2) is held at its ends by spring receptacles (6, 7) and a means (8, 9, 71) is provided for delimiting the spring excursion.

20 Claims, 5 Drawing Sheets

TENSIONER FOR A TRACTION MECHANISM

This application claims the priority of DE 2008 011 368.9 filed Feb. 27, 2008, and which is incorporated by reference herein.

FIELD OF THE INVENTION

The invention relates to a tensioner for a traction mechanism such as a belt, chain or the like, with a tensioning lever which can be acted on by a helical spring, can pivot about a stationary shaft and on which a tensioning element is provided for abutment against the traction mechanism to be tensioned, the helical spring being held at its ends by spring receptacles and a means being provided for delimiting the spring excursion.

BACKGROUND OF THE INVENTION

Generic tensioners or tensioning devices are used for example for tensioning drive belts and control belts in motor vehicles and are intended to ensure, by ensuring an optimum traction mechanism tensioning force even as the traction mechanism ages, at all times optimum functioning and transmission of this force without slippage and without disruptive vibrations. In addition, the connection between the helical spring and axially end-side spring receptacles of the tensioner is intended to be non-detachable during transportation of said tensioner and to be sufficiently secure in dynamic mode. The helical spring can in this case be embodied as a traction spring or else as a compression spring. Embodiment as a compression spring can in particular give rise to the problem that a tear in the traction mechanism causes the compression spring suddenly to expand during operation and the tensioner to break up with high pressure (so-called snapping). This can lead to destruction of the traction mechanism drive as a whole. Generic tensioners are therefore equipped with a suitable means (snapping securing means) to delimit the spring excursion.

DE 195 01 685 C1 discloses a generic tensioner of this type in which the spring excursion delimiting means used is a sheet metal strip which is made of spring steel, is inserted coaxially into the compression spring, is held in a lower spring receptacle by a first securing pin and mounted in the opposing spring receptacle so as to be longitudinally displaceable via balls in a through-guide. In the region of the through-guide, the sheet metal strip is bent over at its end 90° about its longitudinal axis and axially held by a second pin, so that said second pin cannot, with the bent part, pass through the through-guide and said through-guide can thus serve as a spring excursion delimiting means for transport and also snapping securing. This tensioner is mounted on the traction mechanism drive with the spring tensioned and its belt pulley placed against the belt. For tensioning the belt, the securing pin is removed at the belt pulley-side end of the sheet metal strip, so that the compression spring expands as a tensioning lever pivots and presses the tensioning roller against the belt. During this tensioning process the sheet metal strip is displaced in its mounting. However, this does not normally lead to abutment of the stop, formed by the angled segment, of the sheet metal strip against the spring receptacle. This extreme stop state occurs only when the belt to be tensioned tears or stretches excessively owing to ageing or as a result of temperature influences. The described construction provides on this tensioner transport and snapping securing.

OBJECT OF THE INVENTION

The invention is based on the object of proposing a generic tensioner which has a different transport and snapping securing means, can be manufactured inexpensively and also can be assembled easily.

SUMMARY OF THE INVENTION

The invention is based on the finding that, by the use of a suitable design of the transport and snapping securing means, the costs of manufacturing and the complexity of assembling the tensioner can be lowered.

The invention therefore starts from a tensioner for a traction mechanism such as a belt, chain or the like, with a tensioning lever which can be acted on by a helical spring, can pivot about a stationary shaft and on which a tensioning element is provided for abutment against the traction mechanism to be tensioned, the helical spring being held at its ends by spring receptacles and a means being provided for delimiting the spring excursion. According to the invention, provision is additionally made for the spring excursion delimiting means to have an elongate, almost rigid but rotatably mounted component having a substantially round cross section and, in longitudinal section, at least two end-side, substantially right-angled, angled segmens, the component being arranged coaxially within the helical spring and held in the opposing spring receptacles.

Despite a simple and accordingly inexpensive construction of the tensioner, this construction provides an effective and easily mountable transport and snapping securing means. The component pertaining to the spring excursion delimiting means can thus be made inexpensively from, for example, spring wire which is provided at the end side with corresponding angled segments. Ball mounting of this component in a spring receptacle of the tensioner, as in the case of the sheet metal strip of the tensioner of DE 195 01 685 C1, for example, is not necessary.

The sub-claims describe preferred developments or configurations of the invention.

According to a first preferred development of the invention, a provision is made for the component to have two angled segments pointing in the same direction. In this case, it is advantageous in a further configuration if the component reaches with an angled segment into an opening located in the region of a spring receptacle which is close to the tensioning lever and the other angled segment can be brought into operative connection to a stop arranged in the region of the axially opposing spring receptacle which is remote from the tensioning lever. These measures contribute to easy producibility and simplified assembly of the tensioner. Unlike the sheet metal strip, serving to delimit excursion, of the tensioner according to DE 195 01 685 C1, the excursion delimiter, which is embodied as a rigid wire, of the present invention can execute a rotational movement in both axially end-side bearing positions.

According to another preferred development of the invention, provision is made for the aforementioned opening to be formed in an element which can be inserted into the spring receptacle which is close to the tensioning lever. This allows suitable material selection or material pairing with the component pertaining to the spring excursion delimiting means in this region and further facilitates assembly. For example, the insertable element can be made of plastics material; this is advantageous with regard to lower noise formation.

In order further to reduce the design complexity and the diversity of parts, an expedient configuration of the invention provides for the aforementioned stop to be an integral component of the spring receptacle which is remote from the tensioning lever. In an advantageous development of the inventive idea, the angled segments additionally have the same length.

If expediently the elongate component is held in the spring receptacle which is remote from the tensioning lever so as to be longitudinally displaceable by means of at least one sliding guide, this component can be guided in an inexpensive and smooth-running manner. It is in this case advantageous if the materials of the components interacting in the sliding guide are different from one another. Thus, the material pairing used for the sliding guide can for example be steel/plastics material, allowing a significant reduction in noise and free movement. In order to increase flexibility in manufacture, the material pairing of the sliding guide can in a very advantageous configuration of the invention be provided by a sleeve-like element sunk into the spring receptacle which is remote from the tensioning lever. The sleeve-like element and the spring receptacle which is remote from the tensioning lever can thus be manufactured in an inexpensive manner separately from each other and, if necessary, also using different methods.

It is advantageous, if the sleeve-like element has in outline and in cross section a substantially rectangular shape, so that it has two longitudinal walls, two transverse walls and two front walls, the front walls each having an elongate recess and a longitudinal wall being provided with a slot-like recess extending, from one front wall, to at least shortly before the other front wall. This design measure allows on the one hand twist-proof holding of the sleeve in the spring receptacle and on the other hand good guidance of the elongate component, pertaining to the spring excursion delimiting means, in the sleeve.

In order to impart to the helical spring an improved hold in the spring receptacles, the parts serving as spring receptacles should expediently be provided at least partially with elevations pointing in the longitudinal direction of the helical spring, in such a way that the helical spring is guided, when assembled, at its ends radially from the outside through said elevations.

In a further highly advantageous development of the invention, provision may be made for the spring receptacle which is remote from the tensioning lever to be constructed by two interconnected components, one of the components serving at the same time to provide the sliding guide. Thus, the spring receptacle which is remote from the tensioning lever can be divided into two components which can be manufactured very easily, wherein one component can be made of plastics material and the other for example of aluminum or steel.

In order to allow the tensioner to be delivered pre-tensioned and thus to facilitate mounting and also to prevent disassembly, expediently at least one means can be provided for generating a pre-tension or for fixing the helical spring in its position generating a force. This can be achieved advantageously and with a simple design if the means for generating a pre-tension is embodied as a securing cotter pin which can be brought into a spring receptacle and against which the elongate component pertaining to the spring excursion delimiting means is supported with an angled segment axially under tensile loading. According to another variant, provision may be made for the means for generating a pre-tension to be embodied as a jacket surrounding both spring receptacles and also the helical spring.

It is highly expedient for the spring receptacles to be rotatable relative to one another in such a way that said spring receptacles can be brought into a position in which assembly or disassembly of the tensioner is facilitated. Assembling or disassembling the tensioner thus does not require a special tool, but rather can be carried out by simple manual twisting.

A further variant which is in this case preferred provides for the other spring receptacle which is remote from the tensioning lever to have a radially angled portion having a radial groove which serves to receive the angled segment, which is remote from the tensioning lever, of the securing wire during the assembly of the tensioner. For this purpose, the helical spring with the spring receptacles is compressed as far as possible and fixed in this position by the aforementioned securing cotter pin or the holding jacket. As a result, the tensioner is provided for transportation and storage as a complete, pre-tensioned, compact constructional unit which cannot fall apart.

Furthermore, it is advantageous if the tensioner in the region of the spring receptacle which is close to the tensioning lever and a portion of the axially opposing spring receptacle which is remote from the tensioning lever each have a conical inner contour in the region for receiving the securing wire. This construction prevents the locking wire from entering into lateral contact, outside its points of articulation to the two spring receptacles, with these spring receptacles when operation causes the helical spring to buckle slightly. This prevents disruptive operating noises and also reduces the wear to these components.

Another variant provides a tensioner in which the spring receptacle which is close to the tensioning lever has, in the region of its axial end pointing toward the helical spring, at least one holding lug which is embodied in such a way that it can be used to reach behind and to axially and radially fix an end-side spring winding of the helical spring. This design allows, during the assembly of this tensioner, simple engagement of the helical spring with the spring receptacle which is remote from the tensioning lever and is then fastened to the bottom of the spring and of the securing wire with the spring receptacle which is close to the tensioning lever.

The last-described construction allows the securing wire to be circumferentially fixed on the first spring receptacle and/or on the second spring receptacle, i.e. not having to be rotatably arranged about its longitudinal axis, in order to connect the lever-side spring receptacle and the spring receptacle which is remote from the lever by means of the securing wire. The precise design construction and also the assembly of a tensioner of this type will be described in detail in the following description.

BRIEF DESCRIPTION OF THE DRAWINGS

The invention is described hereinafter in greater detail based on preferred exemplary embodiments and with reference to the appended drawings, in which.

DETAILED DESCRIPTION OF THE DRAWINGS

Figures 1, 2:
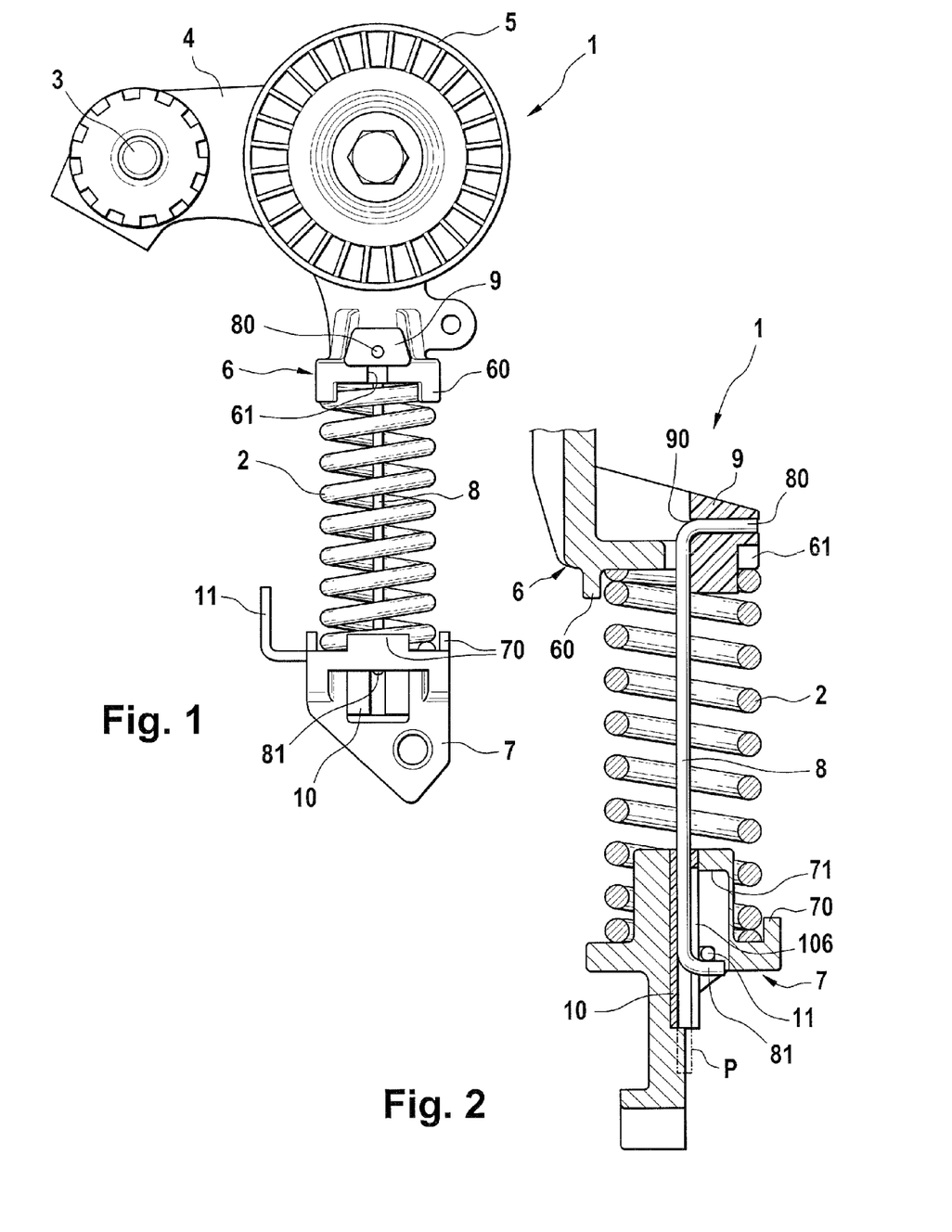
FIG. 1 is a plan view of a first embodiment of a tensioner according to the invention in the assembled state.
FIG. 2 is a partial side view in longitudinal section of the tensioner according to FIG. 1.

Reference will first be made to FIGS. 1 and 2 showing a tensioner 1 with a helical spring 2 embodied as a compression spring. The helical spring 2 is received at its ends in a first and a second (different) spring receptacle 6 or 7 onto which axial elevations 60, 70 are molded over the circumference to improve the radial holding of the helical spring 2. The spring receptacle 6 which is close to the tensioning lever and is shown on top in the drawings is adjoined integrally by a tensioning lever 4 which can pivot about a stationary shaft 3 (for example the fastening point on a motor) and is provided with a receptacle 5 for a tensioning element, for example a tensioning roller.

The helical spring 2 surrounds substantially concentrically an elongate securing wire 8 having at its ends a respective substantially right-angled angled segment 80, 81 pointing in the same direction. However, angled segments pointing in differing directions would also be possible. The upper angled segment 80 is somewhat longer than the lower angled segment 81. An insert element 9, which is inserted or slid into a groove-like recess 61 in the upper spring receptacle 6 which is close to the tensioning lever, can also be seen. The insert element 9 has a hole 90 into which the upper angled segment 80 of the securing wire 8 is introduced. The insert element 9 is secured radially by the helical spring 2 and axially by a dovetail groove in the spring receptacle 6.

A guide sleeve 10, which has a slot-like recess 106 (see also FIG. 3) in which the lower angled segment 81 is guided in a longitudinally displaceable manner, is sunk into the lower spring receptacle 7 which is remote from the tensioning lever.

A securing cotter pin 11 is introduced into the lower spring receptacle 7 which is remote from the tensioning lever, transversely to the longitudinal extension of the securing wire 8, in order to allow the helical spring 2 to be held under pre-tension, for example for transportation or assembly at the site of installation. As becomes clear from FIG. 2, the lower angled segment 81 protrudes in the position shown beyond the securing cotter pin 11 radially in such a way that said cotter pin is pressed, induced by the spring force acting on the spring receptacle 7 which is remote from the tensioning lever, of the helical spring 2, against the angled segment 81 and pre-tensioning can thus be held.

For the purposes of operation which is as quiet as possible, the securing wire 8 on the one hand and the insert element 9 and also the guide sleeve 10 on the other hand are made of differing materials. The securing wire 8 is preferably made of spring steel, whereas the insert element 9 and the guide sleeve 10 are made preferably of plastics material. If the helical spring 2 is not to be embodied so as to be secure against buckling, a preferably wedge-shaped element (not shown) can be inserted into the spring windings so as to prevent buckling.

Figure 3:
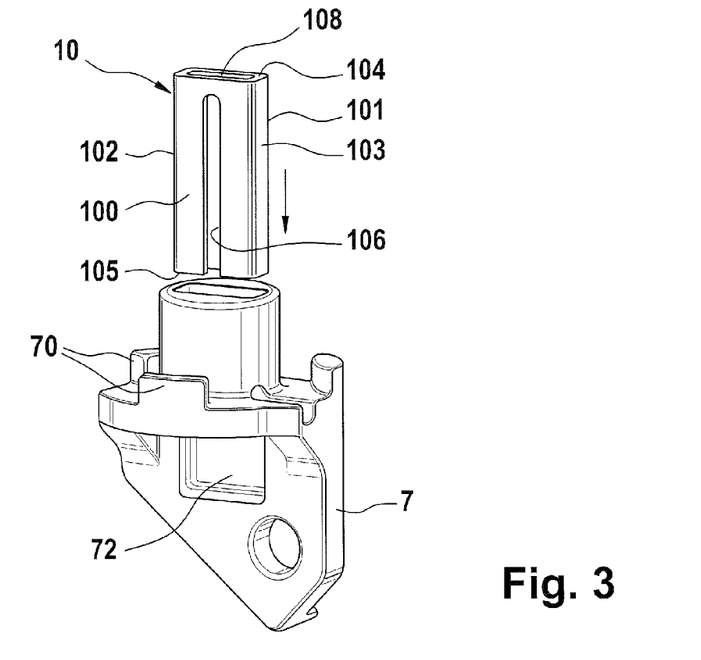
FIG. 3 is an exploded view of the lower spring receptacle of the tensioner according to FIG. 1 with a guide sleeve.
Figure 4:
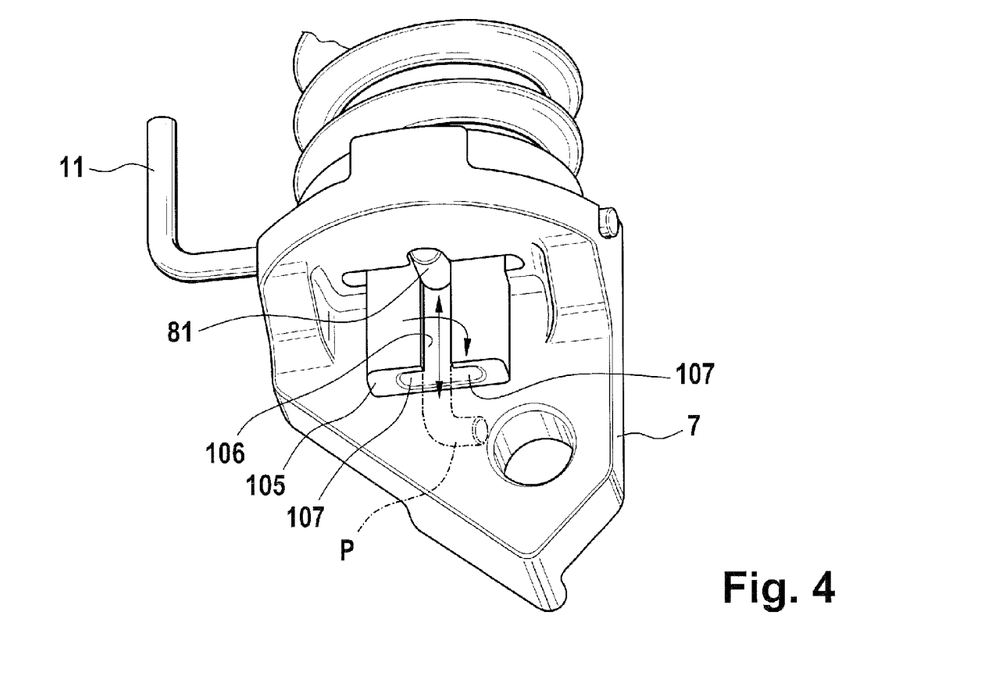
FIG. 4 is a perspective detailed view of the lower spring receptacle of the tensioner according to FIG. 1 with a guide sleeve.

FIGS. 3 and 4 now show in detail the region of the lower spring receptacle 7 which is remote from the tensioning lever. FIG. 3 clearly shows the guide sleeve 10 which has, both in outline and in cross section, a substantially rectangular form with two longitudinal walls 100, 101, two transverse walls 102, 103 and two front walls 104, 105. The longitudinal wall 100 has the aforementioned slot-like recess 106 which serves to guide the lower angled segment 81 of the locking wire 8. The lower front wall 105 has an opening 107 which, viewed from above, is substantially oval and one longitudinal side of which is interrupted merely by the recess 106. Likewise, the upper front wall 104 is provided with a substantially oval opening 108. For the purposes of assembly, the guide sleeve 10 is slid into a correspondingly formed recess 72 in the lower spring receptacle 7 which is remote from the tensioning lever (see double-headed arrow).

Figures 5, 6, 7:
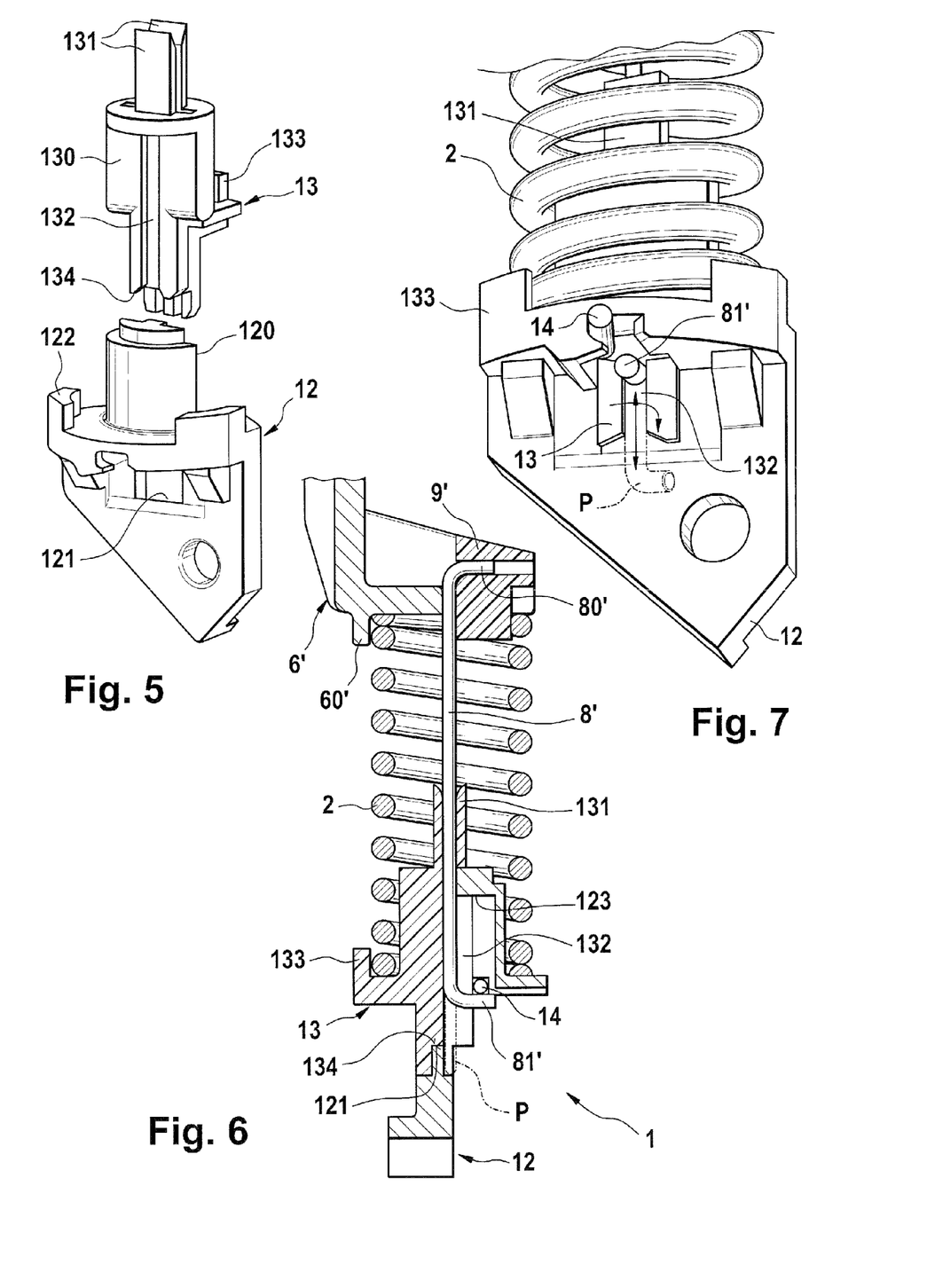
FIG. 5 is an exploded view of the lower spring receptacle of a second embodiment of the invention.
FIG. 6 is a partial side view in longitudinal section of the tensioner according to the second embodiment.
FIG. 7 is a perspective detailed view of the lower spring receptacle of the tensioner according to FIG. 6.

FIGS. 5 to 7 show a second preferred embodiment of the tensioner 1' according to the invention with a modified upper spring receptacle 6' which is close to the tensioning lever and a lower spring receptacle which consists of two parts 12 and 13 and is remote from the tensioning lever. FIG. 5 shows in this case merely the two parts 12 and 13 which are joined together to form the spring receptacle which is remote from the tensioning lever. The part 13 of the lower spring receptacle which is remote from the tensioning lever is in this case brought with a mounting surface 130 onto a correspondingly configured mounting surface 120 of the part 12 until shoulders 121 and 134, which can be seen in the Figures, abut.

The part 13 of the lower spring receptacle which is remote from the tensioning lever is additionally provided with two upwardly extending, flat and opposing guide tongues 131 and also with a slot-like recess 132. The guide tongues 131 surround an axial channel which continues downward and on one side is opened over a substantial length by the recess 132. It would also be possible to embody (in a manner not shown) the part 13 of the lower spring receptacle which is remote from the tensioning lever in two parts, in particular so as to be divided in the longitudinal direction of the helical spring 2, in order to attain a further reduction in the complexity of the individual parts.

FIG. 6 clearly shows that a somewhat modified securing wire 8' is used in the tensioner 1'. Unlike the securing wire 8 of the tensioner 1 according to FIG. 2, this securing wire 8' has two angled segments 80' and 81' of substantially the same length. As can be seen, the portion of the securing wire 8' that is located between the angled segments 80', 81' is additionally guided by the guide tongues 131 of the part 13 of the lower spring receptacle which is remote from the tensioning lever. This further improves the installability of the tensioner according to the invention, as the rigid securing wire 8 or 8' is already radially guided when the helical spring 2 is unloaded. This is a great advantage over the spring excursion delimiting means, which is embodied as a flexible sheet metal strip, of the tensioner according to DE 195 01 685 C1. Furthermore, again, radially outer axial elevations 60' and 122 and 133, respectively, of the upper spring receptacle 6' which is close to the tensioning lever or of the lower spring receptacle which is remote from the tensioning lever (parts 12 and 13) can be seen.

As was previously described with reference to FIG. 2, a securing cotter pin 14, which holds the helical spring 2 under pre-tension in interaction with the lower angled segment 81' in the engagement position of said cotter pin, is present in this case too. The two-part embodiment of the lower spring receptacle which is remote from the tensioning lever allows the individual parts 12 and 13 to be constructed in a comparatively simple manner and to be made from differing materials in accordingly optimized production methods. The part 13 can be made preferably of plastics material and the part 21 preferably of aluminum.

A further feature of the tensioner 1 with the two-part lower spring receptacle 12, 13 which is remote from the tensioning lever according to FIGS. 5 to 7 is the fact that the securing cotter pin 14 is in this case, unlike in the variant according to FIG. 1, withdrawn not laterally but rather forward, i.e. toward the assembler; this facilitates the assembly of the tensioner 1' and the disengagement of the helical spring 2 at the site of installation thereof.

Figure 8:
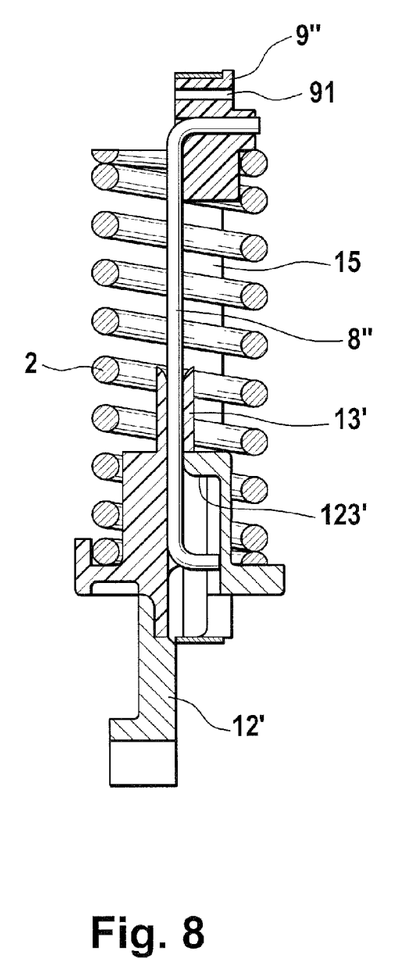
FIG. 8 is a longitudinal section of a further embodiment of the invention in the assembled state, only the tensioning unit of the tensioner being shown.
Figure 9:
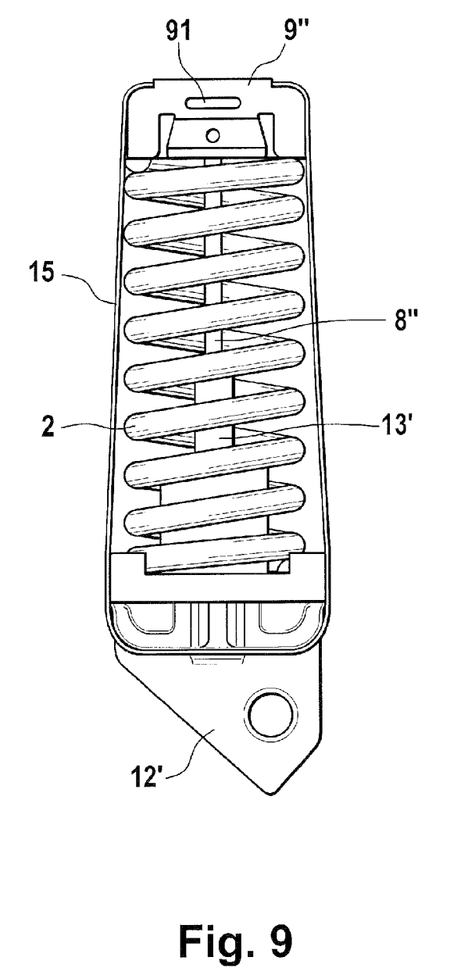
FIG. 9 is a plan view of the tensioning unit according to FIG. 8.

FIGS. 8 and 9 show a further exemplary embodiment of the invention, only the tensioning unit consisting of the helical spring 2, a securing wire 8", an insert element 9" and a lower spring receptacle which is remote from the tensioning lever (and comprises parts 12' and 13'), being shown. The insert element 9" is in this case embodied in such a way that it serves at the same time as a support or receptacle for the helical spring 2. Also shown is a securing jacket 15 which is placed around the insert element 9" and the lower spring receptacle (part 12') which is remote from the tensioning lever; if the length of the securing jacket 15 is selected appropriately, this also allows (without the use of a securing cotter pin 14) a desired pre-tensioning and also the avoidance of buckling of the helical spring 2 during transportation or assembly. In this case too, the securing wire 8", on the one hand, the insert element 9" and the part 13', on the other hand, have mutually differing materials which can be for example spring steel and plastics material. A further advantage of this solution consists in the fact that the tensioning unit can be preassembled as a unit and can be fastened to an upper spring receptacle (not shown) which is close to the tensioning lever by means of a suitable mounting opening 91 in the insert element 9".

The mode of operation of the spring excursion delimiting means for the transport securing and snapping securing of the tensioner will be described hereinafter in greater detail, firstly with reference to FIG. 2:

For transporting the tensioner 1 to its site of assembly and also for assembly thereof, the helical spring 2, which is embodied as a compressive spring, is tensioned as shown and protected by the securing cotter pin 11 from being pressed apart. During assembly, the tensioner 1 is placed against a traction mechanism of a traction mechanism drive using a tensioning roller which is fastened to the receptacle 5. Subsequently, the securing cotter pin 11 is removed, as a result of which the helical spring 2 expands and presses and tensions the tensioning roller securely against the traction mechanism. Should the traction mechanism then tear during operation, then the helical spring 2 can expand only until the angled segment 81 of the securing wire 8 strikes a stop 71 in the lower spring receptacle 7 which is remote from the tensioning lever. This prevents self-destruction of the tensioner 1 as a result of falling-apart thereof, both during its transportation and during its assembly and during operation, for example in the event of the traction mechanism tearing.

In a manner comparable thereto, FIG. 6 shows a stop 123 of the part 12 of the lower spring receptacle which is remote from the tensioning lever, which part would be struck by the angled segment 81', should the traction mechanism tear. Damage to the chain drive or belt drive can be effectively prevented by this snapping securing means. Accordingly, a stop 123', which is shaped into the part 12', is provided in FIG. 8.

Simple assembly or disassembly of the tensioner 1 or 1' merely requires initial slight compression of the two spring receptacles 6 and 7 and 6' and 12, 13, respectively, until the lower angled segments 81 and 81' leave the slot-like recesses 106 and 132. Then, rotation of the two spring receptacles 6 and 7 and 6' and 12, 13, respectively, relative to one another by approximately 90° is necessary until the angled segments 81 and 81' enter a disengagement position P (cf. in particular FIG. 4 and FIG. 7). The length of the angled segment 81 or 81' is of course selected in such a way as to allow said angled segment to be extracted upward from the lower spring receptacle which is remote from the tensioning lever through the openings or inner cavities provided without significant difficulties. The tensioner 1 or 1' is assembled in the reverse order. The tensioning unit of FIGS. 8 and 9 can be assembled or disassembled accordingly.

The tensioners 1 and 1' according to FIGS. 1 to 7 are assembled in the same order, whereas the tensioner according to FIG. 8 and FIG. 9 is disassembled in the opposite order in comparison thereto.

Figures 10, 11, 12:
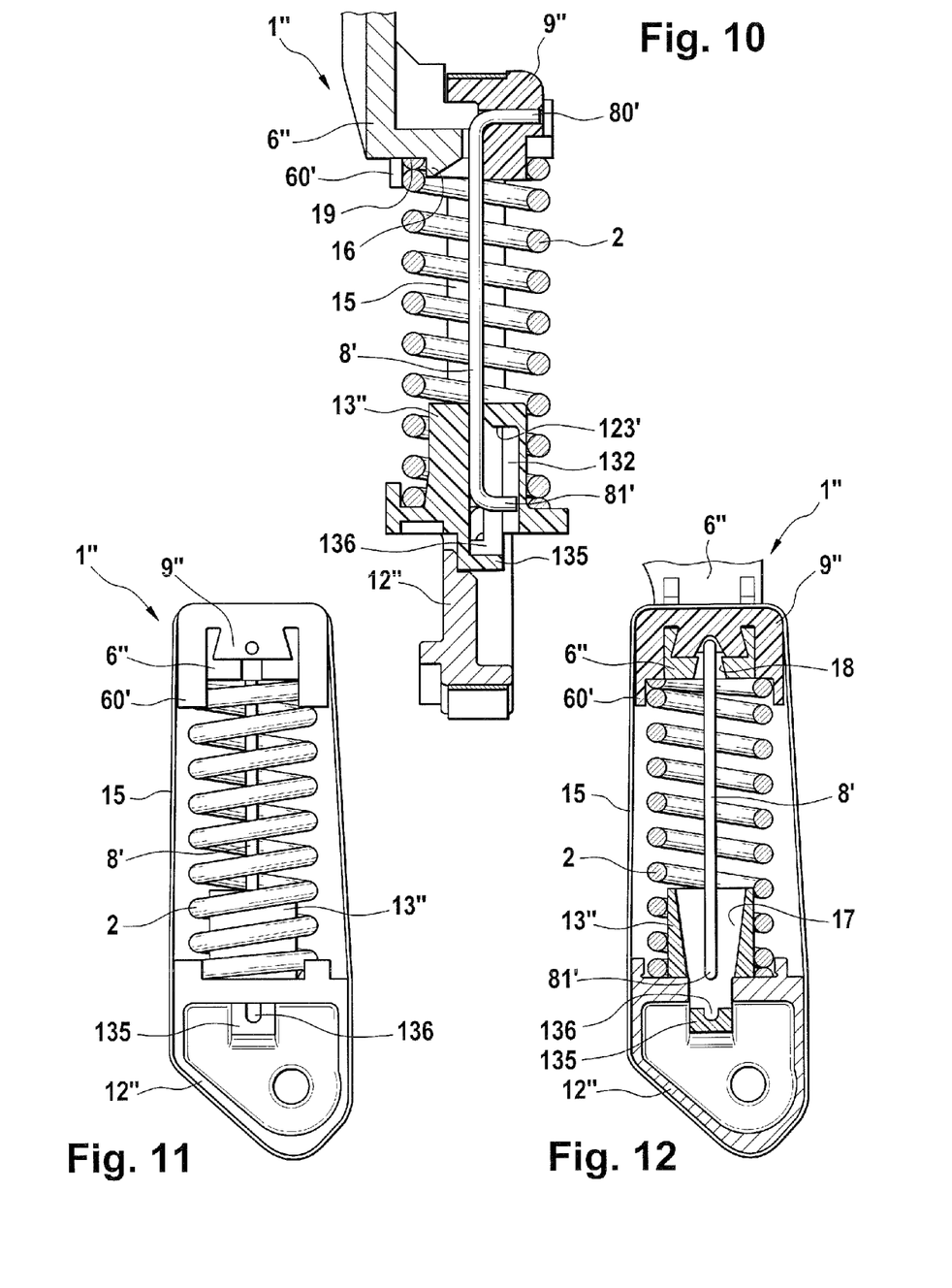
FIG. 10 is a longitudinal section of another embodiment of a tensioner according to the invention in the assembled state, only the tensioning unit of the tensioner being shown.
FIG. 11 is a plan view onto the tensioning unit according to FIG. 10.
FIG. 12 is a plan view of differing section onto the tensioning unit according to FIG. 11.

FIGS. 10 to 12 show a different embodiment of a tensioner 1" embodied in accordance with the invention. In the case of said tensioner, the assembly and disassembly thereof are facilitated as a result of the fact that the axially opposing spring receptacles 6" and 12", 13" do not have to be rotated relative to one another about their longitudinal axis in order to bring the securing wire 8' into engagement or out of engagement with the lower spring receptacle 12", 13" which is remote from the tensioning lever.

In order nevertheless to be able rapidly and easily to join together the components of this tensioner 1" during assembly, provision is made for the securing wire 8' to be fixed to the upper spring receptacle 6" which is close to the tensioning lever by a locking device on said spring receptacle. For this purpose, the spring receptacle 6" which is close to the tensioning lever has a preferably annular locking lug 16 over which an axially outer end of the helical spring 2 is slid. As a result, the locking lug 16 is located, after the sliding-on of the helical spring 2, radially within said spring and reaches behind the last helical spring winding in this case in such a way that said winding is fixed both radially and axially on the upper spring receptacle 6" and is supported axially on a stop surface 19 of the spring receptacle 6".

During assembly of the tensioner 1", the securing wire 8' is therefore inserted first into the two-part, lower spring receptacle 12", 13" which is remote from the tensioning lever, in such a way that the bent-down end 81' of said securing wire is received so as to be able to move axially in a slot-like recess 132 in said spring receptacle. The axial movement of the bent-down end 81' of the securing wire 8' is in this case, as the snapping securing means, delimited in the direction toward the tensioning lever-side spring receptacle 6" by the stop 123' and in the opposite direction by a radially bent-down portion 135 of the part 12" of the lower spring receptacle 12", 13". Formed in this portion 135 is a radial groove 136 which serves to receive the bent-down end 81' of the securing wire 8' in its axially lower position, this position being assumed when the helical spring 2 of the tensioner 1" is compressed as far as possible for attaching a securing cotter pin or a securing jacket 15.

During the further assembly of the tensioner 1", the helical spring 2 is attached to the lower spring receptacle 12", 13" which is remote from the tensioning lever while coaxially receiving the securing wire 8'. Then, the end of the helical spring 2 that is close to the tensioning lever is engaged with the locking lug 16 of the upper spring receptacle 6" which is close to the tensioning lever and finally the insert element 9" is attached to the other end 80' of the securing wire 8'. Finally, the insert element 9" is inserted into the receiving opening in the upper spring receptacle 6" which is close to the tensioning lever. However, deviating therefrom, the insert element 9" can be inserted into the receiving opening in the upper spring receptacle 6" which is close to the tensioning lever also before the engaging of the helical spring 2 with the locking lug 16 of the upper spring receptacle 6" which is close to the spring lever or almost at the same time as this process.

In order to have, in the assembled state for transportation and assembly of the tensioner, at the site of installation a device which is as small as possible, the traction spring 2 is subsequently compressed axially by applying a force on the two spring receptacles 6" and 12", 13", until the end 81' of the securing wire 8' that is remote from the tensioning lever lies in the radial groove 136 in the radial portion 135 of the part 13". Then, the securing jacket 15 is wrapped around the two spring receptacles 6" and 12", 13" and the securing jacket 15 is tensioned by slight relaxing of the helical spring 2. Instead of this securing jacket 15, use can also be made of the securing cotter pin which has been described hereinbefore and prevents in the integrated state axial movement of the securing wire 8'.

As FIGS. 10 to 12 show, in the case of this variant of a tensioner 1" according to the invention, no guide tongues 131 are present on the lower spring receptacle 12", 13" which is remote from the tensioning lever (unlike in the variants according to FIGS. 5 to 9). This advantageously reduces manufacturing costs. In addition, FIG. 13 in particular shows that the spring receptacle 6" which is close to the tensioning lever and the spring receptacle 12", 13" which is remote from the tensioning lever each have a conical inner contour 17, 18 in the region for receiving the securing wire 8', as a result of which the securing wire 8' does not enter into contact with component regions arranged laterally of said securing wire in the event of operationally induced radial buckling of the helical spring 2.

List of reference numerals

| | |
|---|---|
| 1, 1', 1" | Tensioner |
| 2 | Helical spring |
| 3 | Stationary shaft |
| 4 | Tensioning lever |
| 5 | Receptacle for a tensioning element on the tensioning lever |
| 6, 6', 6" | Spring receptacle which is close to the tensioning lever |
| 60, 60' | Axial elevation of the spring receptacle 6 |
| 61 | Recess in the spring receptacle 6 |
| 7 | Spring receptacle which is remote from the tensioning lever |
| 70 | Axial elevation of the spring receptacle 7 |
| 71 | Stop in the spring receptacle 7 |
| 72 | Recess in the spring receptacle 7 |
| 8, 8', 8" | Securing wire |
| 80, 80' | Angled segment |
| 81, 81' | Angled segment |
| 9, 9', 9" | Insert element |
| 90 | Hole in the insert element |
| 91 | Mounting opening in the insert element |
| 10 | Guide sleeve |
| 100 | Longitudinal wall |
| 101 | Longitudinal wall |
| 102 | Transverse wall |
| 103 | Transverse wall |
| 104 | Front wall |
| 105 | Front wall |
| 106 | Slot-like recess |
| 107 | Oval opening in the front wall |
| 108 | Oval opening in the front wall |
| 11 | Securing cotter pin |
| 12, 12' | Part of the spring receptacle |
| 120 | Mounting surface |
| 121 | Shoulder |
| 122 | Axial elevation |
| 123, 123' | Stop |
| 13, 13', 13" | Part of the spring receptacle |

-continued

List of reference numerals

| | |
|---|---|
| 130 | Mounting surface |
| 131 | Guide tongue |
| 132 | Slot-like recess |
| 133 | Axial elevation |
| 134 | Shoulder |
| 135 | Angled portion on 13" for securing wire |
| 136 | Radial receiving groove in 135 |
| 14 | Securing cotter pin |
| 15 | Securing jacket |
| 16 | Locking lug on spring receptacle 6" |
| 17 | Conical inner contour of 13" |
| 18 | Conical inner contour of 6" |
| 19 | Abutment of helical spring 2 against 9" |
| 191 | Abutment of helical spring 2 against 6" |
| P | Disengagement position of the securing wire |

The invention claimed is:

1. A tensioner for a traction mechanism comprising a tensioning lever which is acted on by a helical spring, can pivot about a stationary shaft and on which a tensioning element is provided for abutment against the traction mechanism to be tensioned, the helical spring being held at its ends by a first spring receptacle and a second spring receptacle and a spring excursion delimiting means wherein the spring excursion delimiting means has an elongated, almost rigid, but rotatably mounted securing wire having a substantially round cross-section and, in a longitudinal section, at least two end-sides, substantially right-angled, angled segments, the securing wire being arranged coaxially within the helical spring and held in the opposing first spring receptacle and second spring receptacle.

2. The tensioner according to claim 1, wherein the securing wire has two angled segments pointing in the same direction.

3. The tensioner according to claim 2, wherein the securing wire reaches with an angled segment into an opening located in a region of the first spring receptacle which is close to the tensioning lever and the other angled segment and can be brought into operative connection with a stop arranged in the region of a spring receptacle which is remote from the tensioning lever.

4. The tensioner according to claim 3, wherein the opening is formed in an element which can be inserted into the first spring receptacle which is close to the tensioning lever.

5. The tensioner according to claim 3, wherein the stop is an integral component of the second spring receptacle, which is remote from the tensioning lever.

6. The tensioner according to claim 2, wherein the angled segments have the same length.

7. The tensioner according to claim 1, wherein the securing wire is held in the second spring receptacle which is remote from the tensioning lever so as to be longitudinally displaceable by means of at least one sliding guide.

8. The tensioner according to claim 7, wherein materials of the component interacting in the sliding guide are different from one another.

9. The tensioner according to claim 8, wherein a material pairing of the sliding guide is provided by a sleeve-like element sunk into the second spring receptacle which is remote from the tensioning lever.

10. The tensioner according to claim 9, wherein the sleeve-like element, in outline and in cross section, forms a substantially rectangular shape, so that the sleeve-like element has two longitudinal walls, two transverse walls and two front walls, the front walls each having an elongate recess and a longitudinal wall being provided with a slot-like recess extending from one front wall, up to at least shortly before the other front wall.

11. The tensioner according to claim 1, wherein the parts serving as the first spring receptacle and the second spring receptacle are provided at least partially with elevations pointing in the longitudinal direction of the helical spring, in such a way that the helical spring is guided, when assembled, at its ends radially from the outside through the elevations.

12. The tensioner according to claim 1, wherein the second spring receptacle, which is remote from the tensioning lever, is constructed by two interconnected components, one of the components serving at the same time to provide a sliding guide.

13. The tensioner according to claim 1, wherein at least one means is provided for generating a pre-tension.

14. The tensioner according to claim 13, wherein the means for generating the pre-tension is embodied as a securing cotter pin which can be brought into the second spring receptacle which is remote from the tensioning lever and against which the rotably mounted component pertaining to the spring excursion delimiting means is supported with one of the angled segments axially under tensile loading.

15. The tensioner according to claim 13, wherein the means for generating the pre-tension is embodied as a jacket surrounding the second spring receptacle and also the helical spring.

16. The tensioner according to claim 1, wherein the first spring receptacle and the second spring receptacle are rotatable relative to one another in such a way that the first spring receptacle and the second spring receptacle can be brought into a position in which assembly or disassembly of the tensioner is facilitated.

17. The tensioner according to claim 1, wherein the second spring receptacle, which is remote from the tensioning lever, has a radially angled portion having a radial groove which serves to receive one of the radially angled segments, which is remote from the tensioning lever, of the securing wire during the assembly of the tensioner.

18. The tensioner according to claim 1, wherein the first spring receptacle, which is close to the tensioning lever, and the second spring receptacle, which is remote from the tensioning lever, each have a conical inner contour in the region for receiving the securing wire.

19. The tensioner according to claim 1, wherein the first spring receptacle has, in a region of its axial end pointing toward the helical spring, at least one holding lug which is embodied in such a way that it can be used to reach behind and to axially and radially fix an end-side spring winding of the helical spring.

20. The tensioner according to claim 1, wherein the securing wire is circumferentially fixed on the first spring receptacle which is close to the tensioning lever and/or on the second spring receptacle which is remote from the tensioning lever so as not to be able to rotate about its longitudinal axis.

* * * * *